US010323167B2

(12) United States Patent
Schmidt et al.

(10) Patent No.: US 10,323,167 B2
(45) Date of Patent: Jun. 18, 2019

(54) METHOD FOR FABRICATING A CERAMIC MATERIAL

(71) Applicant: United Technologies Corporation, Farmington, CT (US)

(72) Inventors: Wayde R. Schmidt, Pomfret Center, CT (US); Tania Bhatia Kashyap, Middletown, CT (US); Paul Sheedy, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 203 days.

(21) Appl. No.: 15/267,198

(22) Filed: Sep. 16, 2016

(65) Prior Publication Data
US 2017/0002249 A1 Jan. 5, 2017

Related U.S. Application Data

(62) Division of application No. 13/271,294, filed on Oct. 12, 2011, now Pat. No. 9,533,919.

(51) Int. Cl.
*B05D 3/02* (2006.01)
*C09K 5/14* (2006.01)
(Continued)

(52) U.S. Cl.
CPC .............. *C09K 5/14* (2013.01); *B05D 3/0254* (2013.01); *C04B 35/571* (2013.01);
(Continued)

(58) Field of Classification Search
CPC .............. C04B 35/62842; C04B 35/65; C04B 35/62227; C04B 35/80; C04B 35/6303;
(Continued)

(56) References Cited

U.S. PATENT DOCUMENTS 3,255,027 A 6/1966 Talsma
3,407,125 A 10/1968 Fehlner
(Continued)

FOREIGN PATENT DOCUMENTS

EP 2543650 1/2013
WO 2012048071 4/2012

OTHER PUBLICATIONS

Website capture of National Physical Laboratory Tables of Physical & Chemical Constants from http://www.kayelaby.npl.co.uk/general_physics/2_3/2_3_7.html retrieved Aug. 2, 2018 (Year: 2018).*
(Continued)

*Primary Examiner* — Nathan H Empie
(74) *Attorney, Agent, or Firm* — Carlson, Gaskey & Olds, P.C.

(57) ABSTRACT

A method for fabricating a ceramic material includes impregnating a porous structure with a mixture that includes a preceramic polymer and a filler. The filler includes at least one free metal. The preceramic polymer material is then rigidized to form a green body. The green body is then thermally treated to convert the rigidized preceramic polymer material into a ceramic matrix located within pores of the porous structure. The same thermal treatment or a second, further thermal treatment is used to cause the at least one free metal to move to internal porosity defined by the ceramic matrix or pores of the porous structure.

10 Claims, 1 Drawing Sheet

(51) Int. Cl.

| | | |
|---|---|---|
| *C04B 35/571* | (2006.01) | |
| *C04B 35/589* | (2006.01) | |
| *C04B 35/626* | (2006.01) | |
| *C04B 35/628* | (2006.01) | |
| *C04B 35/76* | (2006.01) | |
| *C04B 35/80* | (2006.01) | |
| *C04B 35/622* | (2006.01) | |
| *C04B 35/63* | (2006.01) | |
| *C04B 35/65* | (2006.01) | |

(52) U.S. Cl.
CPC ........ *C04B 35/589* (2013.01); *C04B 35/6269* (2013.01); *C04B 35/62227* (2013.01); *C04B 35/62842* (2013.01); *C04B 35/62844* (2013.01); *C04B 35/6303* (2013.01); *C04B 35/65* (2013.01); *C04B 35/76* (2013.01); *C04B 35/80* (2013.01); *C04B 35/806* (2013.01); *B05D 2601/28* (2013.01); *C04B 2235/3891* (2013.01); *C04B 2235/40* (2013.01); *C04B 2235/404* (2013.01); *C04B 2235/408* (2013.01); *C04B 2235/421* (2013.01); *C04B 2235/428* (2013.01); *C04B 2235/48* (2013.01); *C04B 2235/483* (2013.01); *C04B 2235/522* (2013.01); *C04B 2235/5216* (2013.01); *C04B 2235/5244* (2013.01); *C04B 2235/5248* (2013.01); *C04B 2235/5252* (2013.01); *C04B 2235/5268* (2013.01); *C04B 2235/616* (2013.01); *C04B 2235/6584* (2013.01); *C04B 2235/661* (2013.01); *C04B 2235/80* (2013.01); *C04B 2235/9607* (2013.01)

(58) Field of Classification Search
CPC ............ C04B 2235/40; C04B 2235/66; C04B 2235/661; C09K 5/14; B05D 3/0245
See application file for complete search history.

(56) References Cited

U.S. PATENT DOCUMENTS

| | | | |
|---|---|---|---|
| 5,441,762 | A | 8/1995 | Gray et al. |
| 6,627,126 | B2 | 9/2003 | Schmidt |
| 6,635,339 | B1 | 10/2003 | Adler et al. |
| 6,699,810 | B2 | 3/2004 | Schwab et al. |
| 7,153,465 | B1 | 12/2006 | Schwab et al. |
| 7,628,942 | B1 | 12/2009 | Miller et al. |
| 7,749,568 | B2 | 7/2010 | Schmidt |
| 2003/0132558 | A1 | 7/2003 | Schmidt et al. |
| 2006/0121266 | A1 | 6/2006 | Fandel et al. |
| 2007/0292690 | A1 | 12/2007 | Schmidt |
| 2008/0020193 | A1 | 1/2008 | Jang et al. |
| 2010/0055492 | A1 | 3/2010 | Barsoum et al. |
| 2011/0071014 | A1 | 3/2011 | Kmetz et al. |
| 2011/0148011 | A1 | 6/2011 | Colopy |

OTHER PUBLICATIONS

European Search Report for European Patent Application No. 12187629.6 completed Jan. 18, 2013.

\* cited by examiner

METHOD FOR FABRICATING A CERAMIC MATERIAL

CROSS-REFERENCE TO RELATED APPLICATION

The present disclosure is divisional application of U.S. patent application Ser. No. 13/271,294, filed Oct. 12, 2011.

BACKGROUND

This disclosure relates to ceramic processing. Ceramic materials are known and used for components such as coatings, ceramic bodies and ceramic matrices. Ceramic materials may be fabricated using techniques such as powder processing and sintering, polymer impregnation and pyrolysis, or melt or slurry infiltration. However, these processing techniques can limit the chemistry and microstructure of the ceramic material.

SUMMARY

Disclosed is a method for fabricating a ceramic material. The method includes impregnating a porous structure with a mixture that includes a preceramic material and a filler. The filler has at least one free metal. The preceramic material is then cured and rigidized to form a green body. The green body is then thermally treated to convert the rigidized preceramic material into a ceramic matrix within the pores of the porous structure. The same thermal treatment or a second, further thermal treatment is used to cause the at least one free metal to move to internal porosity defined by the ceramic matrix.

Also disclosed is a ceramic component that includes a porous structure and a filled polymer-derived ceramic matrix within the pores of the porous structure. The polymer-derived ceramic matrix also contains internal pores from the conversion of the polymer to a ceramic to form the polymer-derived ceramic matrix. At least one of a free metal or a free metal-derived filler compound is located within the internal pores of the polymer-derived ceramic matrix.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
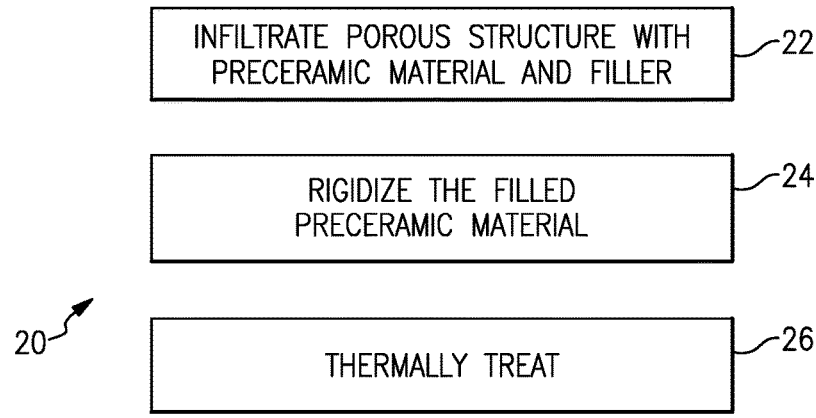
FIG. 1 illustrates a method for fabricating a ceramic material.

FIG. 1 illustrates a method 20 for fabricating a ceramic material. As will be described in further detail below, the method 20 allows fabrication of ceramic materials with new compositions and/or microstructures that are not heretofore available. Furthermore, the method 20 can be used to enhance densification and/or thermal conductivity of ceramic materials for end use components such as turbine engine components.

As illustrated in FIG. 1, the method 20 generally includes steps 22, 24 and 26. Any or all of steps 22, 24 and 26 can be repeated for a desired number of iterations in the method 20 to modify porosity and properties, for example. As shown, at step 22 a mixture is infiltrated into a porous structure. The mixture includes a preceramic material and a filler material. The filler material includes at least one free metal. In this disclosure, a "metal" refers to elements conventionally identified as metals and also to semi-metals or metalloids, such as silicon. A "free metal" refers to a metal or metals that are metallically bonded. In this disclosure, free metals include elemental forms of metals and metal-containing compounds that provide a source of metal, such as through decomposition of an organometallic compound. At step 24, the preceramic material is rigidized, such as by curing, to form a green body. In this disclosure, "rigidized" refers to an increase in the viscosity or molecular weight or resistance to flow of the preceramic material as induced by polymerization, crosslinking, precipitation, curing, condensation or the like. At step 26, the green body is thermally treated to convert the rigidized preceramic material into a ceramic matrix within the pores of the porous structure. The same thermal treatment or a second, further thermal treatment is used to cause the at least one free metal to move into pores of the thermally treated green body. The pores include internal porosity defined by the ceramic matrix as well as pores defined within or at least partially by the porous structure. In one example, the pores range in size from nanometer size to a few hundred micrometers.

The method 20 thus utilizes the infiltration in step 22 to deliver the free metal into the porous structure and the thermal treatment (or subsequent thermal treatment(s)) to infiltrate the free metal into the internal pores of the ceramic matrix as well as pores defined within or at least partially by the porous structure. In one example, the internal pores of the ceramic matrix and/or the pores defined within or at least partially by the porous structure include pores that are not interconnected or surface connected. For example, the internal pores are voids, micro-cracks or other open regions that are formed during the conversion of the preceramic material to ceramic. Infiltrating the free metal into the internal pores of the ceramic matrix and pores defined within or at least partially by the porous structure thereby at least partially fills the pores to enhance the densification of the ceramic material and/or facilitate enhancement of other properties, such as improvement of the thermal conductivity of the ceramic material or to improve the environmental resistance of the ceramic material. Further examples of the method 20 are described below. It is to be understood that the examples disclosed herein may be used individually or in combination with any other example(s).

In one example of step 26, the green body is treated at a temperature that is below the melting temperature of the at least one free metal. The selected thermal treatment temperature, however, is slightly below the melting temperature (e.g., within 10%) of the at least one free metal such that the free metal softens and thereby mobilizes within the ceramic matrix. The mobilized free metal is able to flow and/or diffuse to the internal porosity of the ceramic matrix. The free metal thereby at least partially fills the internal porosity to increase densification of the ceramic matrix and overall ceramic component.

Alternatively, the thermal treatment that converts the preceramic material into the ceramic matrix can be followed by a second, further thermal treatment to mobilize the free metal to move to the internal porosity defined by the ceramic matrix. In one example, the second thermal treatment is conducted at a temperature that is approximately equivalent to the first thermal treatment temperature or, alternatively, at a higher temperature that is above the melting temperature of the free metal. At a temperature exceeding the melting temperature, the free metal liquefies and flows into the internal porosity of the ceramic matrix. In one example based on silicon as the free metal, the silicon expands upon re-solidification and thereby further enhances densification of the final ceramic component.

In embodiments, the porous structure includes or is a fibrous structure having ceramic, metallic and/or carbon fibers. In examples, the ceramic fibers include oxide or non-oxide ceramic fibers. In one example, the fibers are silicon carbide-containing fibers. In a further example, the fibers are coated, prior to the method 20, with a suitable protective coating that serves to chemically protect the fibers and allow for the desired composite mechanical behavior. In embodiments, the protective coating includes an oxide or non-oxide coating and can be a monolayer coating or a multilayer coating.

The preceramic material is a material that converts from a non-ceramic material to a ceramic material. In one example, the preceramic material is a carbosilane-, carbonitride-, silazane-, silane-, or siloxane-based polymer, oligomer or mixture thereof. In one example, the preceramic material is a carbosilane-based material that converts, in the absence of oxygen, to silicon carbide. In another example, the preceramic material is a silazane-based material that converts, in the absence of oxygen, to silicon carbide and silicon nitride. In yet another example, the preceramic material includes heteroatom modifications such as boron, aluminum, zirconium, gadolinium, hafnium or titanium. Given this description, one of ordinary skill in the art will recognize other types of preceramic materials to meet their particular needs.

In one example, the at least one free metal includes silicon. In other examples, additional metals are included with the silicon. In further examples, the free metal or metals are selected from refractory metals, which include boron, titanium, vanadium, chromium, zirconium, niobium, molybdenum, ruthenium, rhodium, hafnium, tantalum, tungsten, rhenium, osmium, iridium and mixtures thereof.

In a further embodiment, the filler within the mixture includes multiple free metals, such as any of those listed in the above examples. The thermal treatment or, alternatively, the second, further thermal treatment not only mobilizes the free metals but also causes the free metals to react together to form a free metal-derived compound within the internal pores of the ceramic matrix. In one example, the free metal-derived compound is molybdenum disilicide ($MoSi_2$) which forms from silicon and molybdenum as the free metals. The filler may range in size from sub-nanometer size to tens or hundreds of micrometers.

In one example, where there is a desire to increase the thermal conductivity of the end use ceramic material, the filler includes the at least one free metal and further includes ceramic particles that have a different thermal conductivity than the ceramic matrix material produced from conversion of the preceramic material. For example, the filler includes the at least one free metal and further includes ceramic particles that have a higher thermal conductivity than the ceramic matrix material produced from conversion of the preceramic material. In one embodiment, the ceramic particles include silicon carbide and the ceramic matrix comprises carbonitride.

In another example, the at least one free metal forms a continuous phase or region within the ceramic matrix. The continuous phase facilitates the enhancement of thermal conductivity of the final ceramic material by providing a continuous thermal conduction path.

Figure 2:
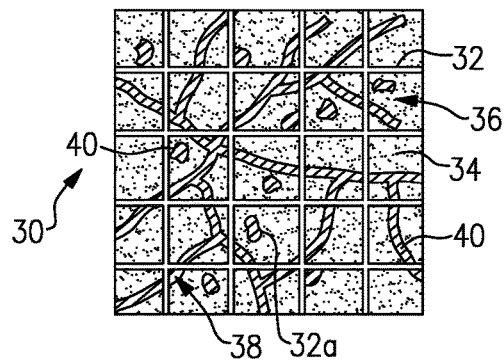
FIG. 2 illustrates an example ceramic component fabricated according to the method of FIG. 1.

FIG. 2 illustrates an example ceramic component 30 fabricated according to the method 20 described above. The ceramic component 30 includes a porous structure 32 and a polymer-derived ceramic matrix 34 within pores 36 of the porous structure 32. In this example, the porous structure 32 is a fibrous structure. The fibrous structure includes two or more parallel sets or tows of fibers that are transversely oriented. In other examples, the fibrous structure is a woven structure, non-woven structure, braided structure, unidirectional fiber lay-up, tape, a two-dimensional structure or three-dimensional structure or other cloth and weave architectures. The fibrous structure can contain continuous, non-continuous or chopped fibers. Given this description, one of ordinary skill in the art will recognize other fibrous structures to meet their particular needs.

The polymer-derived ceramic matrix 34 defines internal pores 38 that result from the conversion of the rigidized material to ceramic during the above-described thermal treatment to form the ceramic matrix 34. In this example, there are also residual pores 32a defined within or at least partially by the porous structure 32. The internal pores 38 are interconnected, non-interconnected, surface connected or non-surface connected. At least one of a free metal or a free metal-derived compound 40 is located within the internal pores 38 of the polymer-derived ceramic matrix 34 and the residual pores 32a. As described above, the free metal can include silicon and/or refractory metals. If multiple free metals are used, the metals may react to form the free metal-derived compound.

In a further example, multiple free metals are used and include at least silicon in combination with one or more of the refractory metals described above. In the thermal treatment or subsequent thermal treatment, the silicon reacts with the one or more of the refractory metals to form a silicide. In embodiments, the silicide includes titanium silicide, chromium silicide, zirconium silicide, hafnium silicide, niobium silicide, tantalum silicide, tungsten silicide, molybdenum silicide or combinations thereof.

In one example, the composition of the ceramic component 30, by volume percentage, is:
  20-70 of the porous structure,
  1-12 of a coating on the porous structure, and
  1-40 of a remainder portion, including the at least one of the free metal and the free-metal derived compound, the preceramic material-derived ceramic matrix and any residual void volume, wherein on a fractional basis 10-100% of the 1-40 volume percent is the free metal and the free-metal derived compound and the balance of the 1-40 volume percent is the preceramic material-derived ceramic matrix and residual void volume, wherein the residual void volume is typically less than 20. In a further example, the residual void volume is less than 5.

In a further example, the above composition of the ceramic component 30 is:
  30-50 of the porous structure,
  2-5 of the coating, and
  2-26 of the remainder portion.

Figures 3, 4:
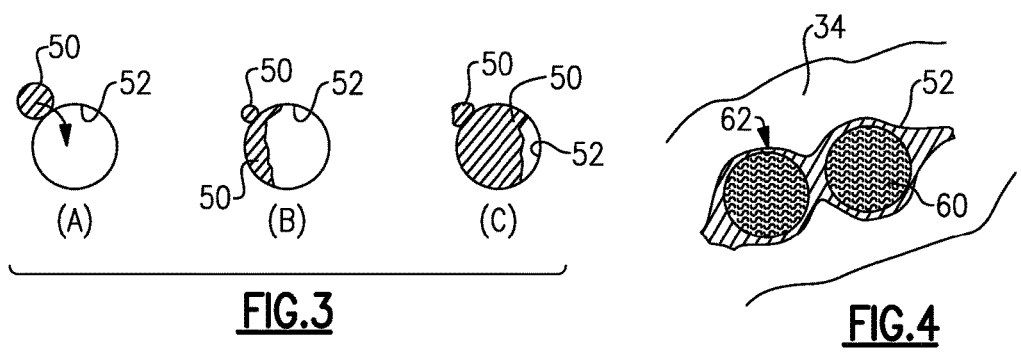
FIG. 3 illustrates an infiltration of a free metal into an internal pore.
FIG. 4 illustrates an example wherein a ceramic component includes ceramic particles and a free metal or free metal-derived compound that coats the ceramic particles.

FIG. 3 shows the infiltration of a free metal 50 into a pore 52 during thermal treatment in the method 20. The pore 52 may be an internal pore of the preceramic material-derived ceramic matrix 34 or a pore defined within or at least partially by the porous structure 32. This example is based on using silicon as the free metal. In stage (A), the free metal 50 is initially located adjacent the pore 52 at the beginning of the thermal treatment. In stage (B), the thermal treatment mobilizes the free metal 50 such that the free metal can move by flowing, diffusion or both into a portion of the pore 52. In stage (C), upon cooling, the free metal 50 expands within the pore 52 to further fill the pore 52. Thus, the free metal facilitates the densification of the ceramic component 30.

FIG. 4 shows another example wherein the preceramic material-derived ceramic matrix 34 includes ceramic particles 60, such as silicon carbide particles. In this example, upon thermal treatment, the free metal 52 migrates and coats the ceramic particles 60 such that there is a continuous region 62 or phase of the free metal or free metal-derived compound that extends through the ceramic matrix 34.

In one example, the ceramic particles 60 are coated with the one or more free metals prior to mixing with the preceramic material in the method 20. During the thermal treatment to mobilize the free metal or metals, the free metal moves through internal pores of the ceramic matrix 34 and interconnects to form the continuous region 62 or phase.

In another example, the ceramic particles 60 are not initially coated with the one or more free metals in the mixture with the preceramic material in the method 20. During the thermal treatment to mobilize the free metal or metals, the free metal moves through internal pores of the ceramic matrix 34, coats the ceramic particles 60 and interconnects to form the continuous region 62 or phase.

In a further example, the selected free metal, or at least one of the free metals, is chemically compatible with the selected ceramic particles 60 such that the free metal or metals have an affinity to the ceramic particles 60. For example, the ceramic particles 60 include, as a constituent element, the same element as the free metal or at least one of the free metals. For instance, the ceramic particles 60 are silicon carbide and the free metal or metals include silicon. In further examples, the ceramic particles 60 are a carbide of the selected free metal or at least one of the selected free metals.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for fabricating a ceramic material, the method comprising:
    infiltrating a porous structure with a mixture that includes a preceramic material and a filler, the filler including ceramic particles coated with the at least one free metal;
    rigidizing the preceramic material to form a green body; and
    thermally treating the green body to convert the rigidized preceramic material into a ceramic matrix within pores of the porous structure, wherein the thermal treatment or a second, further thermal treatment is used to cause the at least one free metal to move to internal porosity defined by the ceramic matrix or residual open pores of the porous structure.

2. The method as recited in claim 1, wherein the porous structure comprises a fibrous structure.

3. The method as recited in claim 1, wherein the at least one free metal comprises silicon.

4. The method as recited in claim 1, wherein the at least one free metal is selected from a group consisting of boron, titanium, vanadium, chromium, zirconium, niobium, molybdenum, ruthenium, rhodium, hafnium, tantalum, tungsten, rhenium, osmium, iridium and combinations thereof.

5. The method as recited in claim 1, wherein the ceramic particles have a higher thermal conductivity than the ceramic matrix.

6. The method as recited in claim 1, including thermally treating the green body in an environment that is substantially free of oxygen, to convert the rigidized preceramic material into the ceramic matrix.

7. The method as recited in claim 1, including thermally treating the green body at a temperature that is below the melting temperature of the at least one free metal, to convert the rigidized preceramic material into the ceramic matrix.

8. The method as recited in claim 1, including thermally treating the green body at a first temperature to convert the rigidized preceramic material into the ceramic matrix, and wherein the second thermal treatment is used at a second temperature that is greater than the first temperature to cause the at least one free metal to move to the internal porosity defined by the ceramic matrix or the residual open pores of the porous structure.

9. The method as recited in claim 1, including using at least two free metals and reacting the at least two free metals together to form a compound.

10. The method as recited in claim 1, wherein the at least one metal forms a continuous phase within the ceramic matrix.

* * * * *